Patented Apr. 29, 1930

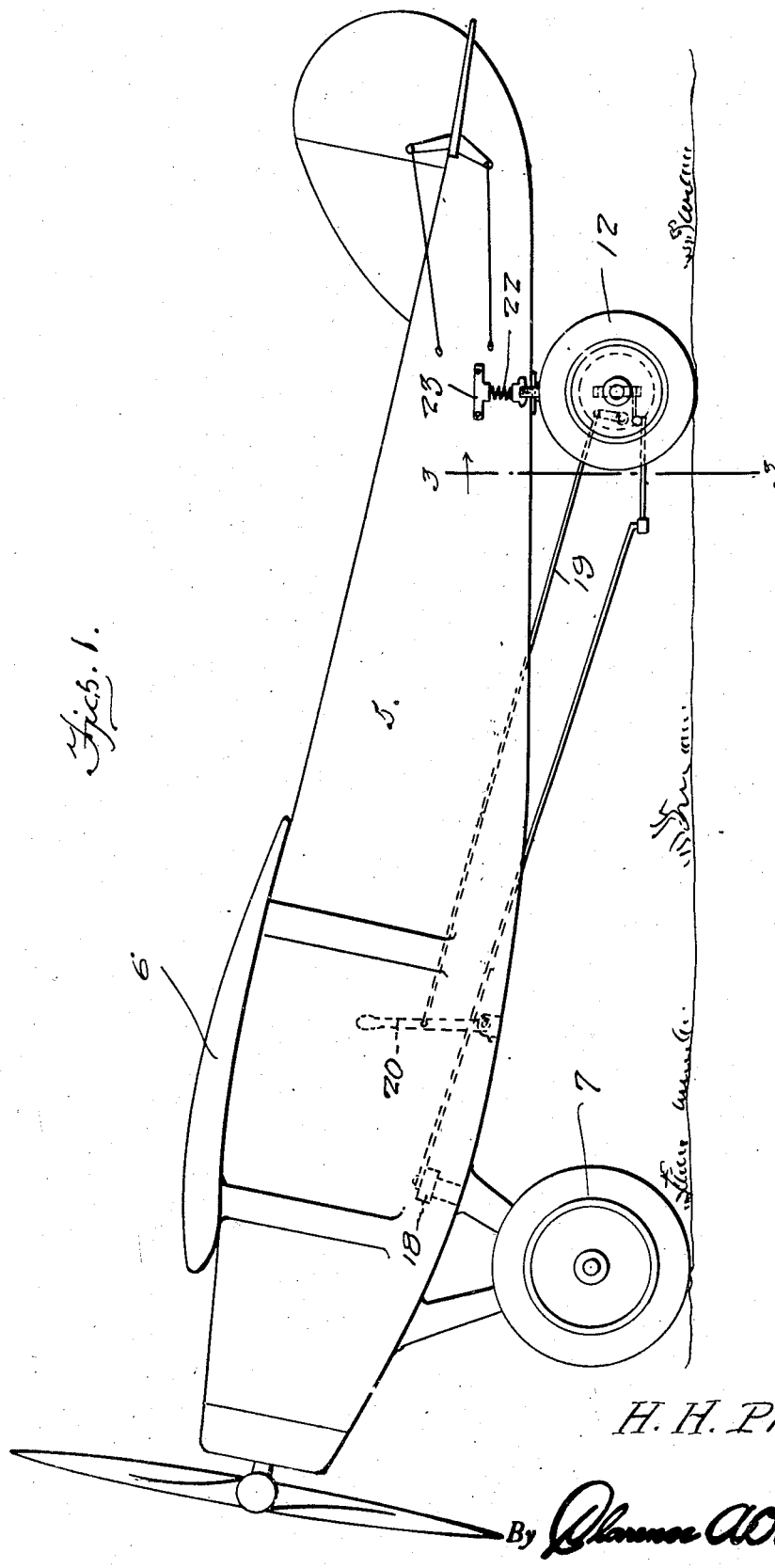

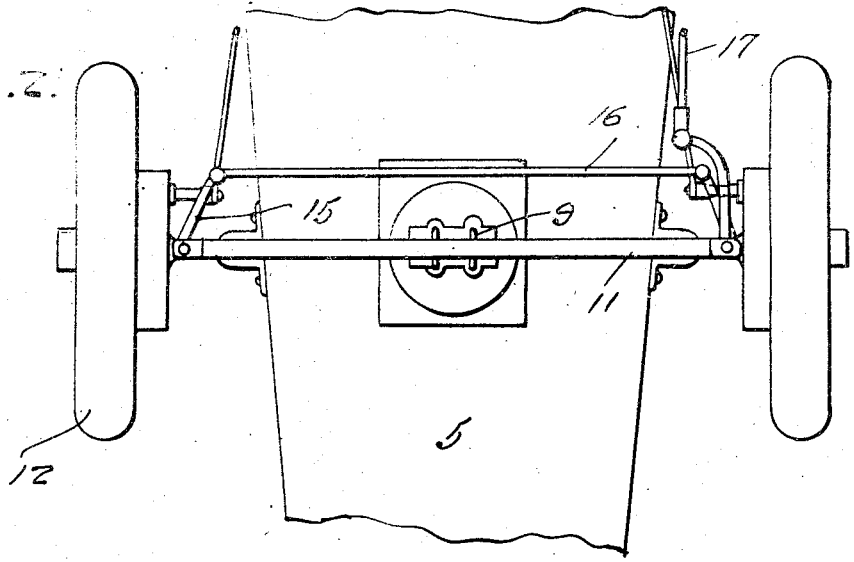
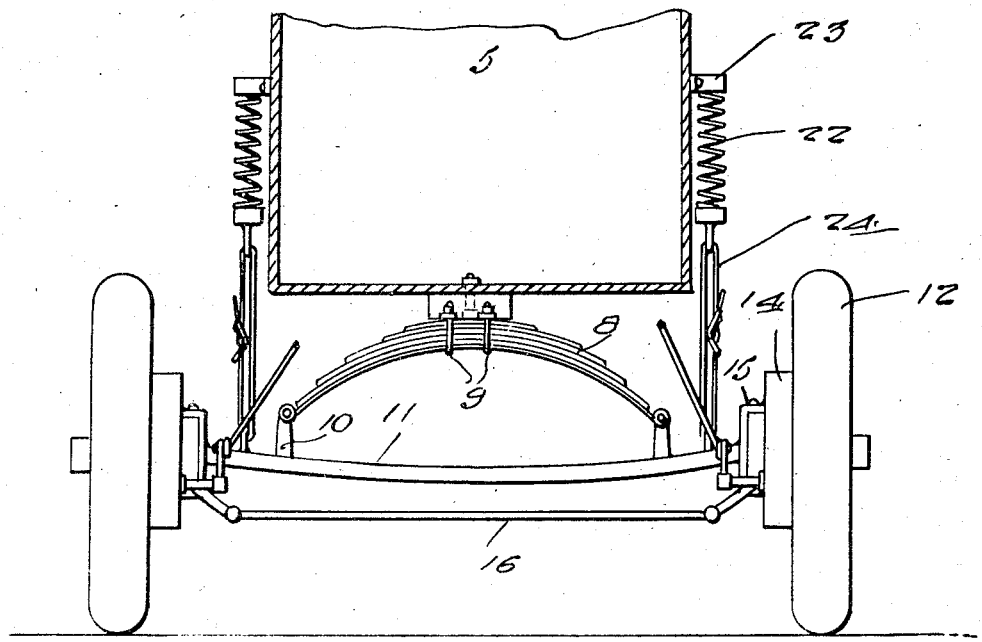

1,756,209

UNITED STATES PATENT OFFICE

HENRY H. PHILLIPS, OF JUDITH GAP, MONTANA

LANDING GEAR FOR AEROPLANES

Application filed August 9, 1928. Serial No. 298,510.

The present invention relates generally to aeroplanes and more particularly to a resilient landing gear therefor and has for its prime object to provide means for breaking the speed of the aeroplane when the same has landed.

Another very important object of the invention resides in the provision of a landing apparatus which enters into action and provides yielding resistance to landing shocks that might otherwise damage or destroy the aeroplane.

A still further very important object of the invention resides in the provision of an extremely simple rear landing gear which may be steered for maneuvering on the ground.

A further important object of the invention resides in the provision of a landing gear of this nature which is strong and durable, inexpensive to manufacture and install, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of an aeroplane embodying the features of my invention;

Figure 2 is a fragmentary bottom plan view thereof showing my improved landing gear, and Figure 3 is a vertical transverse section taken substantially on the line 3—3 of Figure 1 looking in the direction of the arrows.

Referring to the drawing in detail it will be seen that the numeral 5 denotes the fuselage having the wing 6 and front running gear 7.

These parts are of conventional construction and have been illustrated merely for the purpose of bringing out the utility of my improvement.

My improvement refers particularly to the rear landing gear and includes a semi-cylindrical spring 8 anchored by suitable means 9 intermediate its ends to the bottom of the fuselage 5 adjacent the rear end thereof. This spring extends transversely and is pivotally engaged with spring perches 9 on an angle 11 upon the ends of which are journaled wheels 12 having brakes 14 associated therewith.

These wheels are mounted on the axle so as to be dirigible but suitable knuckles 15 are connected together by tie rods 16 so as to move in unison.

The wheels are actuated for steering purposes through a rod 17 which is engaged with a pivoted foot bar 18 in the cockpit of the fuselage 5. The brakes are actuated through rods 19 actuated by a lever 20 in the cockpit.

Shock absorbers are associated with the rear landing gear and includes springs 22 anchored by suitable means 23 on the sides of the fuselage and connected with the end portions of the axle 11 by means of adjustable straps 24.

The landing gear may have any suitable number of wheels and brakes may be associated over all the wheels.

From the above detailed description it will be seen that the aeroplane may be efficiently maneuvered on the ground in a reliable manner and when making a landing shock of the landing will be absorbed to a great extent by the spring 8 and the rebound prevented from being excessive by the shock absorber described. Furthermore the brakes are efficient in braking the aeroplane to a stop within a comparatively short distance after the same has landed on the ground thus eliminating the necessity of excessive coasting which requires considerable room for the ordinary aeroplane to land in.

It is thought that the construction, operation, utility and advantages of the invention will now be quite apparent to those skilled in this art without a more detailed description thereof.

The present embodiment of the invention has been described in considerable detail merely for the purposes of exemplification since in actual practice it will attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:

In an aeroplane including a fuselage, a rear landing gear therefor including a transversely extending semi-elliptical spring, means for securing the center of the spring to the fuselage, the ends of the spring terminating below and within the plane of the sides of the fuselage, a dead axle having its ends extending beyond the sides of the fuselage, means for securing the ends of the spring to the dead axle, and dirigible wheels carried by the ends of the axle and disposed beyond the sides of the fuselage.

In testimony whereof I affix my signature.

HENRY H. PHILLIPS.